United States Patent [19]
Antoine et al.

[11] 3,857,697

[45] Dec. 31, 1974

[54] METHOD OF CONTINUOUSLY SMELTING A SOLID MATERIAL RICH IN IRON METAL IN AN ELECTRIC ARC FURNACE

[75] Inventors: Jacques Antoine, Longeville-les-Metz; Pierre Vayssiere, Metz, both of France

[73] Assignee: Institut de Recherches de La Siderurgie Francaise, Germain-en-Laye, France

[22] Filed: Feb. 27, 1974

[21] Appl. No.: 446,424

[30] Foreign Application Priority Data
Mar. 5, 1973   France .............................. 73.07711

[52] U.S. Cl. .............................. 75/11, 13/9, 13/12, 75/12
[51] Int. Cl. ......................... C22d 7/00, H05b 7/18
[58] Field of Search .................................. 13/9, 12; 75/10–12

[56] References Cited
UNITED STATES PATENTS
| | | |
|---|---|---|
| 3,131,246 | 4/1964 | Robinson ................................. 13/9 |
| 3,156,754 | 11/1964 | Duchting ................................. 13/9 |
| 3,483,917 | 12/1969 | Nikulin ............................... 75/10 R |
| 3,565,603 | 2/1971 | Klee ....................................... 75/11 |
| 3,767,831 | 10/1973 | Plockinger .......................... 75/10 R |

*Primary Examiner*—L. Dewayne Rutledge
*Assistant Examiner*—Peter D. Rosenberg
*Attorney, Agent, or Firm*—Kurt Kelman

[57] ABSTRACT

Iron metal is continuously smelted in an electric arc furnace having three electrodes energized with three-phase current. Solid material rich in iron metal is continuously fed into a zone of the furnace hearth proximate two electrodes generating long and strongly radiating arcs and molten metal is continuously discharged in a zone of the hearth proximate the third electrode generating a short arc of limited radiation. This method is useful for continuously processing scrap-iron or pre-reduced solid material in the continuous production of steel.

5 Claims, 4 Drawing Figures

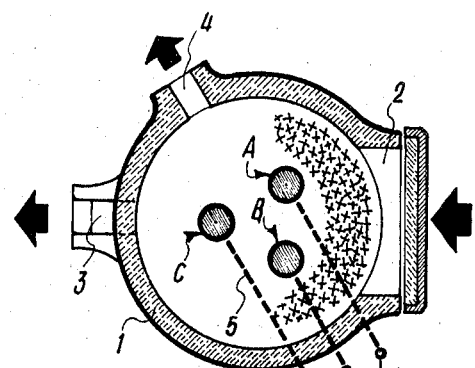
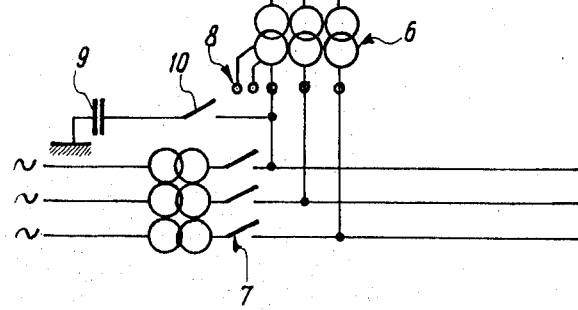
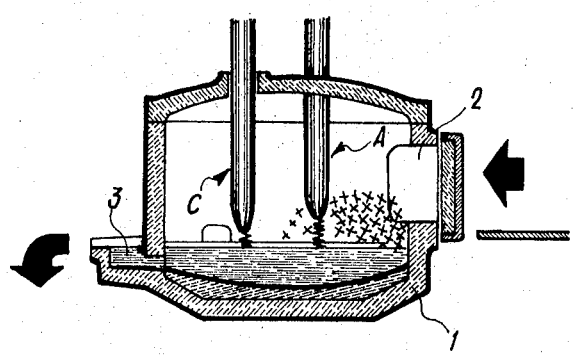
FIG.1
FIG.2

METHOD OF CONTINUOUSLY SMELTING A SOLID MATERIAL RICH IN IRON METAL IN AN ELECTRIC ARC FURNACE

The present invention relates to improvements in the continuous processing of a solid material rich in iron metal in an electric arc furnace.

In the steel making art, it is conventional to prepare molten iron metal in an electric arc furnace from a charge of a solid material rich in iron metal, such as scrap-iron, the solid charge being subjected to the radiation from electric arcs generated by the electrodes of the furnace to melt the metal. In the smelting phase, the characteristics of the electric current energizing the furnace electrodes are usually so controlled that a relatively high radiation is obtained, particularly during the period when the solid charge is not fully melted. For a given electric power dissipated in the arc, the longer the arc the greater the radiation generated. Once an incipient bath of molten metal has been formed in the furnace, the length of the arc may be taken to be roughly the distance between the end of the arc generating electrode and the surface of the bath. Because it is subject to fluctuations in time, the geometrical position of the arc cannot be accurately defined, however, and there can only be a question of the order of magnitude in this respect. When the entire solid charge has melted, it is common practice to limit the radiation by diminishing the length of the arcs so as to avoid excessive wear of the refractory walls and to transmit to the bath of molten metal the greatest possible part of the energy dissipated by the arcs. The characteristics of the electrode energizing current are accordingly adjusted. This period is used to perform the refining of the molten metal and the adjustment of the bath temperature prior to the pouring operation.

In one known type of such installations, an electric arc furnace constitutes a first stage in which the furnace is used essentially as a smelting means while the refining and bath temperature adjusting operations are effectuated in an adjoining receptacle constituting the second stage of the installation. In such an installation, the characteristics of the electrode energizing current for the arc furnace are so controlled as to maintain relatively long, strongly radiating arcs, particularly in cases where the furnace walls can be permanently protected from the radiation by unmelted solids. Generally speaking, the energizing current characteristics and the corresponding value of the radiation have been adapted to the rate of feeding the solid material into the furnace.

It is a primary object of this invention to improve the operating conditions in a continuous method of smelting a solid material rich in iron metal in an electric arc furnace, particularly in respect of charging the material into the furnace, discharging the molten metal from the furnace, and increasing the life of the refractory furnace walls.

The above and other objects and advantages are accomplished according to the invention with a method of continuously processing a solid material rich in iron metal in an electric arc furnace having three electrodes energized with three-phase current. An incipient bath of the molten metal is formed in the furnace and at least one of the characteristics, for instance the electric current intensity, of the electric current energizing the electrodes is controlled to produce a first voltage drop of relatively high value between two of the electrodes and the bath, and a second voltage drop of substantially lower value than the value of the first voltage drop between the third electrode and the bath. The first voltage drop establishes or generates long and strongly radiating arcs across the electrodes and the bath, and the second voltage drop establishes or generates a short arc of limited radiation across the third electrode and the bath. The solid material is substantially continuously fed into a zone of the furnace proximate the two electrodes, and the molten metal is continuously discharged proximate the third electrode.

The "characteristics" of the electric current energizing the electrodes are understood to be the respective values of the intensity and the voltage of the power supplied. These values may be controlled independently or simultaneously to act upon the radiation of the corresponding arc.

The total voltage drop per phase, including the current supply circuit and arc, may be the same for all three phases of the energizing current, or it may be different for at least one of the phases from that of the two other phases, always including the current supply and arcs.

In accordance with other preferred features, an excess of solid material is maintained permanently in contact with the molten metal in the furnace zone proximate the two electrodes, and the capacity of the energizing current for the third electrode is increased to increase the power factor in the corresponding phase.

The above and other objects, advantages and features of the present invention will become more apparent from the following detailed description of a now preferred embodiment thereof, without limiting this invention thereto, taken in conjunction with the accompanying drawing wherein:

FIG. 1 shows a horizontal section of an electric arc furnace arranged for performing the method of the invention, including a circuit diagram of the energizing current for the furnace electrodes;

FIG. 2 is a vertical section of the furnace;

Figure 3:
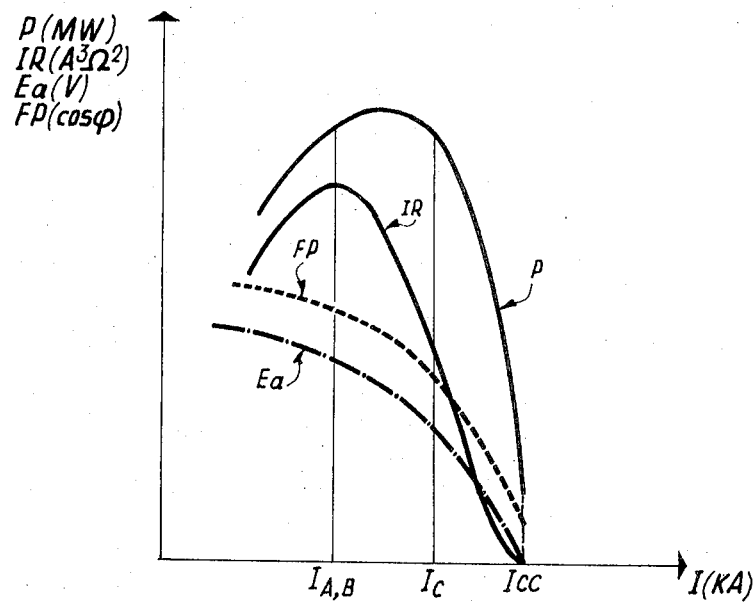
FIG. 3 is a graph of the electric power supply or energizing current characteristics, illustrating a first operating mode.

Referring now to the drawing and first to FIGS. 1 and 2, the electric arc furnace is shown to comprise refractory-lined pan 1 whose side wall defines lateral opening 2 through which the solid material rich in iron metal may be charged and which may be closed by a suitable door. Substantially diametrically opposite opening 2, a siphon 3 enables the molten metal to be discharged from the pan. As shown in FIG. 1, the side wall of the furnace defines port 4 between opening 2 and siphon 3 for discharge of the slag formed during the smelting operation.

The top wall of the furnace has three orifices receiving electrodes A, B and C which are conventionally arranged at the corners of an equilateral triangle. As shown in FIG. 2, the electrodes extend into the furnace to a predetermined level to generate arcs of predetermined lengths across the tips of the electrodes and the surface of the bath of molten metal in the furnace pan. One of the electrodes, i.e. electrode C, is positioned in a zone of the furnace proximate molten metal discharge siphon 3 while the two other electrodes A and B are positioned in a zone of the furnace proximate lateral opening 2 through which the solid material is fed into the furnace.

The electrodes may be supported in any suitable or conventional manner (now shown), for instance by electrode bearing arms or suspended from cables supported on a super-structure. Since the furnace is essentially of the fixed type, the latter arrangement may prove advantageous because it leaves the immediate furnace surroundings unobstructed. The electrode support or suspension means are controlled by suitable servo means (also not shown in view of their conventional design) enabling the level of the electrodes in relation to the molten metal bath in the furnace to be adjusted to produce the desired distances between the respective electrode tips and the surface of the bath. Since the electrode supports and the servo means are well known in the steelmaking art, no description thereof is required to those skilled in this art.

If desired, this electric arc furnace may constitute the first stage in an installation for making refined steel by a continuous process, the second stage of the installation being constituted by any conventional receptacle (not shown), such as another electric arc furnace or an induction-heated furnace whereinto the smelted metal siphoned from the furnace is poured for refining.

As shown in FIG. 1, the electrodes are energized with three-phase current, the electric power supply being delivered to the electrodes by cables 5 connecting each electrode to the secondary winding of a power transformer 6 whose primary winding may be connected to the three phases of a high-voltage, three-phase power network by operation of sectionalizing switch 7 arranged in each connecting line between the power network and a respective transformer primary. For a ready understanding, the three power supply phases will be designated by the same letters A, B and C as the electrodes to which they are connected, thus forming phases A, B and C energizing the respective electrodes of the same letters.

According to the present invention, at least one of the characteristics of the electric current energizing electrodes A and B is controlled to produce a voltage drop of relatively high value between the electrodes and the bath to establish long and strongly radiating arcs across the electrodes and the bath in a zone proximate to lateral opening 2 through which the solid material is fed while the characteristics of the electric current energizing electrode C is controlled to produce a voltage drop of lower value to establish a short arc of limited radiation in a zone proximate to siphon 3. Since the radiation from an electric arc depends on the length thereof for a given power, FIG. 2 shows a relatively short arc established across electrode C and the bath while a relatively long arc is established between electrode A and the bath. It is understood, however, that the illustration of the arcs serves solely to illustrate the nature of the phenomena involved and is not reflective of any quantitative aspect which will be discussed hereinafter in detail.

Referring once more to the circuit diagram in FIG. 1, at least the primary phase of power transformer 6 energizing electrode C, i.e., the electrode generating the short arc, is controllable by adjustment tap 8. Those skilled in the art are familiar with the adjustment of the voltage at the secondary of the power supply transformer for the electrode of an electric arc furnace by providing the primary of the transformer with switchable voltage taps, such an arrangement being used to select the secondary winding voltage according to the nature of the processes to be performed in the electric arc furnace.

As also shown in the circuit diagram, it is preferred to interpose a bank of capacitors 9 of adjustable capacitance between the transformer secondary and the power supply network in phase C, the capacitors being selectively placed into, and removed from, the supply circuit by operation of switch 10. The capacitors are connected in parallel to provide a sum of their capitances but it should be understood that each capacitor may include a series of cascade-connected capacitors to enable the same to withstand the high voltage applied to their terminals. The bank of capacitors 9 constitutes a means for adjusting the power factor of the phase with which they are associated, the capacity of the energizing current of this phase being increased to increase the power factor in this phase.

FIG. 3 shows a graph of the characteristic curve of an electric arc furnace. Such curves may be plotted for any given furnace by calculation and on the basis of experimental data, and depend on the design characteristics of the furnace and its power supply circuit. The curves shown in FIG. 3 accordingly show the pattern of evolution of the physical quantities involved, with the strictly quantitative aspects being specific to each given furnace. In order to simplify the description, the three phases are assumed to behave identically, each characteristic curve being, therefore, common to the three phases. Although modern furnaces tend towards such balanced phases, it is nevertheless to be understood that such equilibrium is by no means essential to the preformance of the method of this invention.

Along the X-axis is plotted the current intensity I (in Kiloamperes) per phase flowing through the electrodes, the points $I_{A,B}$, $I_C$ and $I_{CC}$ respectively corresponding to the current intensity settings in electrodes A, B and C, and to the short-circuit current intensity when any one of the electrodes is brought into contact with the bath. The following parameters are plotted along the Y-axis:

P (in megawatts): curve P represents the total active power input per phase drawn from the network, plotted as a function of current intensity;

IR (amperes$^3$ × ohms$^3$): curve IR represents the radiation from any one of the arcs as a function of current intensity;

FP (power factor): curve FP represents the power factor for each phase as a function of current intensity, the capacitors 9 being inoperative for phase C;

Ea (in volts): curve Ea represents the voltage drop in the arc for each phase, as a function of current intensity.

These curves are plotted for a total voltage drop per phase, power supply circuit and arc included, that is to say for a transformer secondary-winding voltage of equal value for the three phases, for instance the maximum voltage at the transformer secondary. The quantities P, FP and Ea and their development are known in the electrical engineering art. The quantity IR is often used by electric arc furnace specialists to show the pattern of evolution of the arc radiation, and is defined by the relation $$IR = Pa.Ea/d^2$$

wherein Pa is the power dissipated in the arc, i.e. the total power P per phase less the ohmic losses in the power supply circuit, Ea is the total voltage drop in the arc, and d is the distance between the arc and the furnace wall. The quantity IR is usually known as the "refractory index" in the electric furnace art. It should be noted that the "refractory index" is an empirical notation by means of which the arc radiation can be related to wear in the refractories forming the furnace wall. This representation has been shown to agree well with experience, and varies with the radiation from an arc. In the present context, the notion of refractory index is used essentially in its arc radiation aspect, the factor d being involved as a constant specific to each installation.

The curves shown in FIG. 3 represent the well known qualitative evolution of the phenomena involved, to wit:
 the total active power input per phase passes through a maximum;
 - the radiation passes through a maximum usually for a current intensity value different from the value giving maximum total power input;
 - the power factor decreases as the current intensity increases;
 the voltage drop in the arc decreases with increasing current intensity.

It is likewise known that the length of an arc increases as the voltage drop Ea in the arc increases. By way of example, the arc length for an ohmic drop of 10 volts in the arc is estimated at 1 cm.

The diagram in FIG. 3 permits a detailed explanation of the means used in accordance with the method of this invention for obtaining the claimed arc effects. Strongly radiating arcs are obtained between electrodes A, B and the bath by adjusting the current intensity to a datum value close to the value at which the radiation IR passes through a maximum, i.e. at $I_{A,B}$. With such a setting, relatively long arcs are established across electrodes, A, B and the bath, the voltage drop $Ea_{A,B}$ in these arcs being high and the power factor being likewise relatively high. A limited-radiation arc between electrode C and the bath is obtained by adjusting the current intensity in the corresponding phase to a datum value representing a limited value for radiation IR, i.e. at $I_C$. This setting results in establishment between electrode C and the bath of an arc of a length substantially less than the length of the arcs struck across electrodes A, B and the bath, the voltage drop $Ea_C$ being substantially less than the voltage drop $Ea_{A,B}$. The value of the power factor corresponding to the intensity $I_C$ is relatively low.

It is to be understood that the values $I_{A,B}$ and $I_C$ shown in the diagram in FIG. 3 are given by way of example only and that a furnace operator can control these values independently or simultaneously in order to increase or reduce the imbalance between the phases, due allowance being made in particular for the effect of such operations on the power factor, the electrical efficiency, the stability of the arcs and the more or less pronounced imbalance in the values of the active power drawn from the supply network per phase. In the case herein considered, it is to be noted that the active power drawn from the network is substantially the same for all three phases. These control operations, nevertheless, remain within the scope of the invention.

It may be seen that the choice of a high value for the current intensity in the phase corresponding to a limited-radiation arc, in this case the phase C, necessarily implies a relatively low power factor for this phase. Whereas an increase in the power factor above a certain value is disadvantageous for the operator, a reduction thereof below a certain value is a drawback for the electric power supplier and could entail tariff rate penalties. It is possible in such cases to reduce the reactive power for the phase in question by switching the capacitors 9 to a capacitance value such that the power factor is raised to what is considered a satisfactory value.

The respective current intensities of the three phases are controlled by the operator in accordance with the principles set forth hereinbefore, with due allowance for such local operating data as the nature of the materials charged into the furnace, the required rate of smelting and the possible degree of bath overheating. From the current intensity values are deduced the input settings for the servo system controlling the electrode positions, in a well known manner. The most commonly used servo systems maintain a constant impedance in each phase. It is to be noted that all the quantities involved remain constant (with due allowance for operating fluctuations) throughout the duration of a smelting operation. In other words, the process is performed continuously and reproducibly over a relatively long period, for instance between two furnace relining operations. As a result, furnace operation is extremely smooth and does not give rise, as in conventional intermittent processes, to large variations in the electrical quantities involved.

Figure 4:
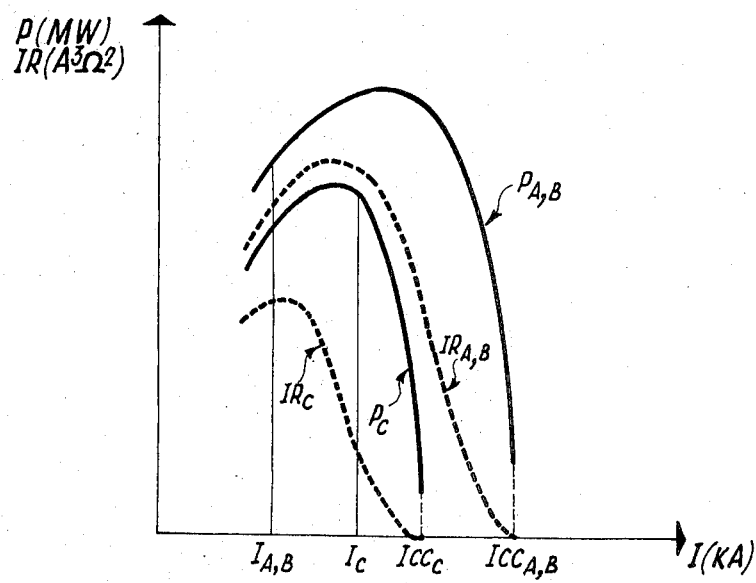
FIG. 4 is a like graph illustrating a second operating mode.

FIG. 4 is a plot of the power P and refractory index IR curves as defined with reference to the diagram in FIG. 3, these curves being plotted respectively for different total voltage drop values in each phase, i.e. for different voltages at the transformer secondary winding. In this instance, the voltage value selected for phases A and B corresponding to strong-radiation arcs are identical to the value of the power transformer secondary voltage, which voltage is preferably the maximum available voltage, and the voltage for the phase C corresponding to a limited-radiation arc is selected less than the maximum voltage by switching the corresponding phase of the transformer primary to an intermediate adjustment tap. The curve $P_{A,B}$ plots the pattern of development of the active power drawn from the electric current supply network for phases A and B, for the maximum voltage available at the transformer secondary. The curve $P_C$ plots the pattern of development of the active power drawn from the network for phase C, for the voltage set at the transformer secondary by adjustment of the transformer primary. For a given current intensity in the three phases, the active power varies with the voltage per phase; in this instance, the power dissipated in phase C is less than the power dissipated in phases A and B for a given value of the intensities $I_A$, $I_B$, $I_C$. The same applies to the curves representing the radiation $IR_{A,B}$ and $IR_C$. In the diagram in FIG. 4, the value $I_{A,B}$ of the current flowing through electrodes A, B is chosen so as to obtain relatively high radiation, and a value $I_C$ for the current flowing through electrode C is chosen so as to obtain limited radiation. The values $I_{A,B}$ and $I_C$ are each so chosen that the active power drawn from the network differs little for the three phases. Although the curves plotted in FIG. 4 are given solely in order to illustrate the pattern of development of the quantities involved, it may be noted that the selection of different voltages for the three phases contributes to amplifying the effect of choosing different current intensities, as explained with reference to FIG. 3. The two operating modes thus are complementary to obtain the desired effect.

It is to be noted that equilibrium of the active powers drawn from the network per phase is by no means a limitative aspect of performance of the method according to this invention. This aspect is evaluated as a function of the conditions accepted by the electric power supplier. A possibly very pronounced imbalance can be offset by means external to the furnace.

The method of this invention improves the operating conditions of an electric arc furnace used for continuous smelting, it being possible to select the electric power supply characteristics of certain electrodes so as to generate strongly radiating arcs and to feed the material to be smelted into the corresponding furnace zone. It is thereby possible to achieve rapid and continuous smelting of the solid material, the latter being preferably distributed in such manner as to protect the furnace walls from direct and indirect radiation from the arcs in this zone. For instance, the characteristics of the electrical energy supplied to an arc may be selected simultaneously in such manner as to produce a limited-radiation arc, the latter being struck in a zone of the furnace where the walls thereof cannot be protected by the charge. The energy dissipated in the limited-radiation arc is transmitted primarily to the bath, thereby allowing of a certain temperature rise in the molten metal in the corresponding zone. This facilitates the metal discharge operations in this zone, particularly when the existence of surplus solid material in the furnace causes the temperature of the bath in the smelting zone to be maintained automatically at a relatively low value in the region of the liquidus temperature, provided that the solid material is at least partly submerged in the bath.

The method of this invention offers all the advantages inherent in prior art methods of continuously smelting solid materials rich in iron metal in an electric arc furnace, and most notably a reduction in thermal losses (the furnace being maintained in a reproducible thermal condition for long periods), a reduced consumption of electrodes (the electrodes being subjected to far fewer movements than in intermittent processes and less subject to the risk of breakage), reduced consumption of refractories (it being possible so to position the charge as to protect the walls from powerful arc radiation) and lastly the possiblity of integrating the furnace into a complex for continuously producing semi-finished products. It additionally offers innate advantages stemming from its specific characteristics described hereinabove. In particular, continuous or quasi-continuous furnace charging operations (such charging taking place in a restricted and readily accessible part of the furnace) are simplified to limit the consumption of refractories not merely in the zone protected by the solid material being smelted but also in the unprotected zone subjected to the direct effect of a limited-radiation arc, and the flow of materials is improved by providing a possibly overheated flat-bath zone. Yet another advantage is that the electrodes producing strongly radiating arcs are the seat of a relatively low current intensity, which helps to reduce the wear in such electrodes.

What is claimed is:

1. A method of continuously processing a solid material rich in iron metal in an electric arc furnace having three electrodes energized with three-phase current, comprising the steps of
   1. forming an incipient bath of the molten metal in the furnace,
   2. controlling at least one of the characteristics of the electric current energizing the electrodes to produce
      a. a first voltage drop of relatively high value between two of the electrodes and the bath, this first voltage drop establishing long and strongly radiating arcs across the electrodes and the bath, and
      b. a second voltage drop of substantially lower value than the value of the first voltage drop between the third electrode and the bath, this second voltage drop establishing a short arc of limited radiation across the third electrode and the bath,
   3. feeding the solid material substantially continuously into a zone of the furnace proximate the two electrodes establishing the long and strongly radiation arcs to melt the iron metal, and
   4. continuously discharging the molten metal in a zone of the furnace proximate the third electrode establishing the short arc of limited radiation.

2. The method of claim 1, wherein the electric current intensity is the characteristic controlled to produce said voltage drops, the total voltage drop per phase, current supply circuit and arc included, being the same for all three phases of the energizing current.

3. The method of claim 1, wherein the electric current intensity is the characteristic controlled to produce said voltage drops, the total voltage drop for at least one of the phases, current supply circuit and arc included, being different from that for the two other phases, current supply circuit and arc included.

4. The method of claim 1, wherein an excess of the solid material is maintained permanently in contact with the molten metal in the furnace zone proximate the two electrodes establishing the long and strongly radiating arcs.

5. The method of claim 1, wherein the capacity of the energizing current for the third electrode is increased to increase the power factor in the corresponding phase.

* * * * *